United States Patent [19]

Chadha et al.

[11] Patent Number: 5,744,907
[45] Date of Patent: Apr. 28, 1998

[54] BINDERS FOR FIELD EMISSION DISPLAYS

[75] Inventors: Surjit S. Chadha; Charles M. Watkins, both of Meridian, Id.

[73] Assignee: Micron Display Technology, Inc., Boise, Id.

[21] Appl. No.: 587,722

[22] Filed: Jan. 19, 1996

[51] Int. Cl.$^6$ .................................................. H01J 19/24
[52] U.S. Cl. ......................... 313/497; 313/310; 313/308
[58] Field of Search .................................. 313/495, 496,
313/308, 309, 310, 336, 351, 463, 466, 497

[56] References Cited

U.S. PATENT DOCUMENTS 5,210,472  5/1993  Casper et al. .......................... 315/349

OTHER PUBLICATIONS

R.C. Ropp, "The Chemistry of Artificial Lighting Devices", Studies in Organic Chemistry, No. 17, pp. 520–538, Dec. 1993.

T.C.D. Hud, et al., "Novel Technique of Phosphor Dep. ...", IEEE Transactions on Electronic Devices, vol.ED–33, No.8, Aug. 1986, pp. 1227–1230.

T. Hase, et al., "Screen Fabrication Techniques", Advances in Electronics & Electron Physics, vol. 79, pp. 332–337; pp. 319–320, Dec. 1990.

*Primary Examiner*—Ashok Patel
*Attorney, Agent, or Firm*—Hale and Dorr LLP

[57] ABSTRACT

Binders, both inorganic and organic, are used for providing sufficient binding action to hold powder phosphor particles together as well as to the glass screen of a field emission display device.

11 Claims, 2 Drawing Sheets

BINDERS FOR FIELD EMISSION DISPLAYS

GOVERNMENT RIGHTS

This invention was made with Government support under Contract No. DABT63-93-C-0025, awarded by the Advanced Research Projects Agency (ARPA). The Government has certain rights in this invention.

BACKGROUND OF THE INVENTION

The present invention generally relates to an improvement in the binding of phosphors to the display screen of field emission displays and, in particular, to the use of inorganic and organic binder materials which may be either conductive or semi-conductive.

Field emission display (FED) technology utilizes a matrix addressable array of pointed, thin film, cold field emission cathodes in combination with a phosphor luminescent screen, as represented for example by U.S. Pat. No. 5,210,472, the disclosure of which is incorporated herein by reference. An emissive flat panel display operates on the principles of cathodoluminescent phosphors excited by cold cathode field emission electrons. A faceplate having a cathodoluminescent phosphor coating, similar to that of a cathode ray tube, receives patterned electron bombardment from an opposing baseplate thereby providing a light image which can be seen by a viewer. The faceplate is separated from the base plate by a narrow vacuum gap. Arrays of electron emission sites (emitters) are typically sharp cones on the cathode that produce electron emission in the presence of an intense electric field. A positive voltage is applied to an extraction grid, relative to the sharp emitters, to provide the intense electric field required for generating cold cathode electron emission.

Prior art FIG. 1 is a photocopy of FIG. 1 of the above-referenced U.S. Pat. No. 5,210,472. FIG. 1 shows a perspective view of the baseplate of a field emission display. As shown, the baseplate includes a plurality of base electrode strips 12A–12C, and a plurality of grid electrode strips 11A–11C. A plurality of field emission cathodes, or emitters, 13 are disposed on the base electrode. The tip of each emitter is surrounded by a grid strip aperture 14. In operation, voltages applied to the base electrode and the grid electrode cause selected emitters to emit electrons that travel towards a faceplate.

FEDs are less tolerant to particle shedding from the faceplate than CRTs, and thus excellent and repeatable adhesion and faceplate integrity are required. The cathode of the field emission display is in very close proximity to the faceplate and is sensitive to any electronegative chemicals arriving on the cold cathode emitter surfaces, which could absorb them and increase the value of the emitter work function. Typically FEDs are operated at anode voltages well below those of conventional CRTs. The material properties of the surface, distance along the surface, and changes in the orientation of the surface relative to a straight line between the two voltage nodes determine the voltage at which flashover between the cathode and faceplate occurs. Because FEDs employ lower anode voltages, phosphor material screening and the process of binding them to each other and to the faceplate have to be optimized and tightly controlled to minimize the dead layer and allow for effective excitation of the phosphor. Most phosphor lifetimes are largely determined by the total accumulated charge delivered per unit area through the life of the display.

SUMMARY OF THE INVENTION

The present invention relates to the use of binders, both inorganic and organic, for providing sufficient binding action to hold powder phosphor particles together as well as on the glass screen of a field emission display. The binder materials can be either conductive or semi-conductive in nature.

DETAILED DESCRIPTION OF AN ILLUSTRATIVE EMBODIMENT

Figure 1:
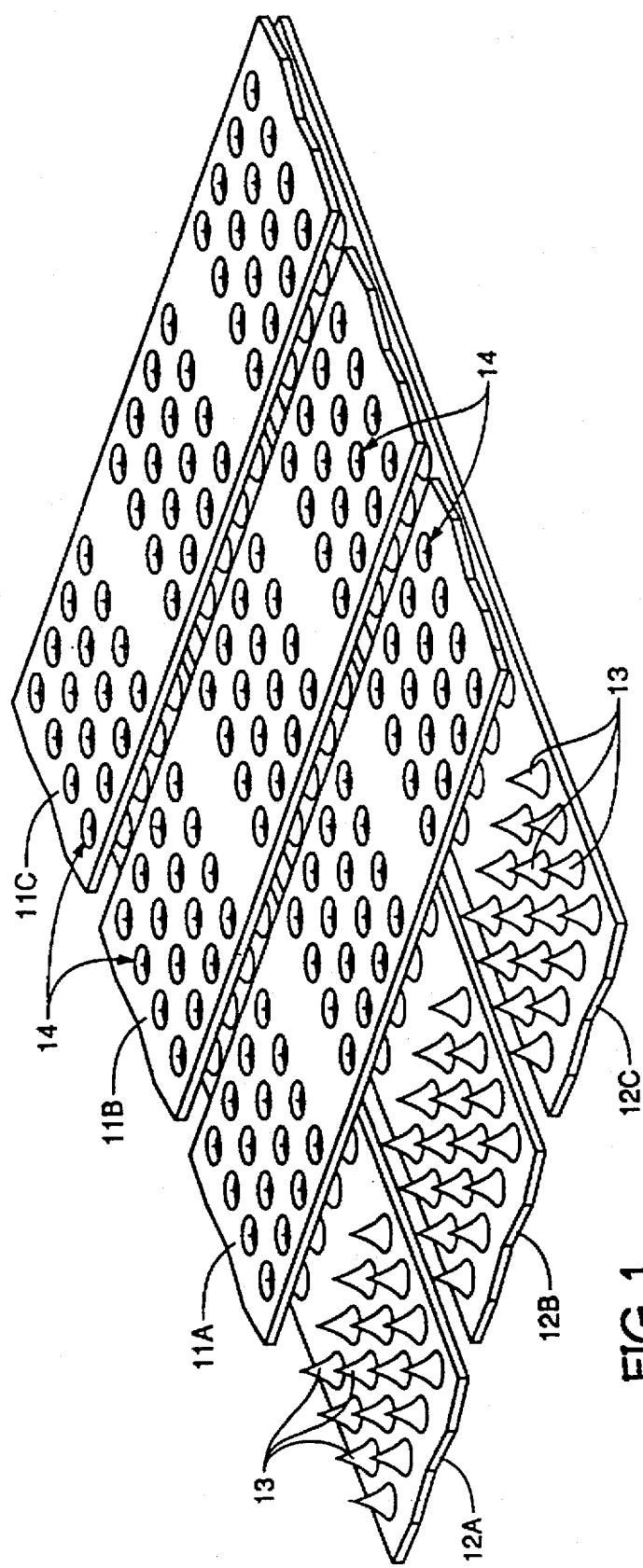
FIG. 1 shows a perspective view of the baseplate of a prior art field emission display.

Field emission displays emit visible light following excitation of a phosphor screen via electrons from a cold cathode based on either silicon (Si), molybdenum (Mo), tungsten (W), etc. microtips. As the phosphor coated screen is in very close proximity with the microtips, any particles which come loose from the phosphor screen could cause fatal damage to the tips or shorting. As such, the present invention proposes to the use of binders, both inorganic and organic, for providing sufficient binding action to hold the powder phosphor particles together as well as on the glass screen. Furthermore as the phosphor screen of a field emission display is not normally aluminized, as are most cathode ray tubes, there is a possibility of space charge build up which could lead to a decreased luminescent efficiency. Thus the present invention further proposes that the binder materials used be of a conductive or a semi-conductive nature to eliminate this problem.

Preferably the binder, according to the present invention, is polyvinyl alcohol, potassium silicate, ammonium silicate, or it may be such that heating the phosphor/binder screen yields a conductive binder, e.g., tin(II) 2-ethylhexanoate, tin (IV) isopropoxide, tin (II) oxalate, titanium (IV) ethoxide, zinc 2,4-pentane dionate, zinc acetate, zinc oxalate. Suitable binder materials include poly(propylene carbonate), poly (propylene carbonate) and poly(ethylene Carbonate) sold by PAC Polymers Inc. of Greenville, Del. as QPAC-40 Emulsion, QPAC-40 and QPAC-25, respectively.

For these compounds a simple heating process removes the organics and leaves behind a conducting or semiconducting oxide which binds the phosphor particles to each other and to the glass screen. The glass screen is normally coated with transparent conducting film such as indium tin oxide (ITO), zinc oxide (ZnO), tin oxide ($SnO_2$) with antimony (Sb) doping, cadmium oxide (CdO), cadmium tin oxide $Cd_2SnO_4$, (cadmium stannate) etc.

In general these organometallic compounds would be from the following group: cadmium (Cd), titanium (Ti), zinc (Zn), tin (Sn), indium (In), antimony (Sb), tungsten (W), niobium (Nb), etc. which would form conductive and semi-conductive oxides when heated. In addition, these oxides are preferably transparent.

Three phosphors (green, red, blue) are applied to the faceplate in separate (wet application i.e., as a slurry or electrophoresis or dry application i.e., as a powder on a wetted faceplate) operations. The phosphor particles range in size from 1 to 5 μm in diameter and are coated to a thickness of 1–10 μm, or 1–3 particles deep. The subject binders are applied with or after the phosphors in a similar wet operation.

The preferred method for applying these binders is by spray coating, or by adding to the phosphor material during its deposition.

In another embodiment, the anode may be patterned with a mask, such as photoresist, to prevent accumulation of the conductive binder in unwanted areas, such as between conductive traces.

The binding material is heat treated to temperatures in the range of to 20° C. to 600° C. for a period of from 2 to 200 minutes under pressures of from 760 to $10^{-6}$ Torr in an atmosphere of air or somewhat reducing atmosphere, depending on the type of binder.

The present invention may be subject to many modifications and changes without departing from the spirit or essential, characteristics thereof. The present embodiment should therefor be considered in all respects as being illustrative and not restrictive of the scope of the invention as defined by the appended claims.

Figure 2:
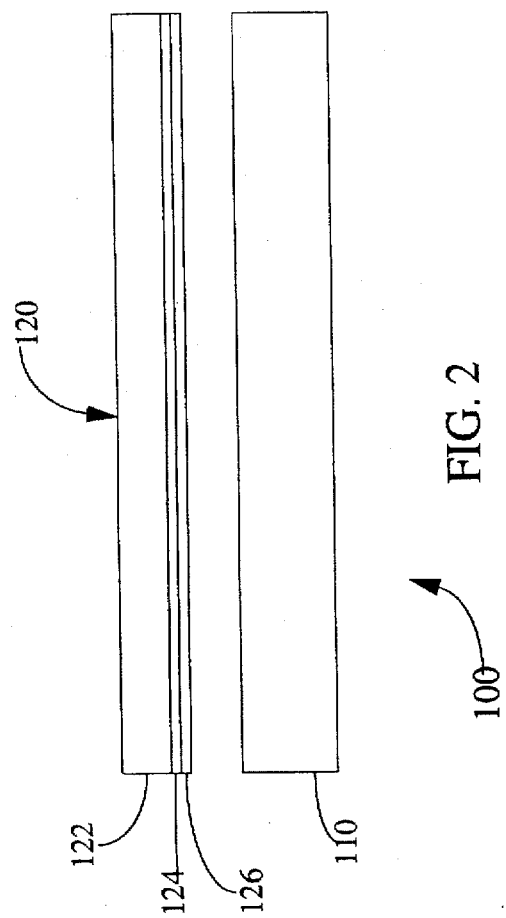
FIG. 2 shows a block diagram of a field emission display constructed according to the invention.

FIG. 2 shows a block diagram of a portion of a field emission display 100. Display 100 includes a baseplate 110 of the type shown in FIG. 1 having conical emitters. Display 100 also includes a faceplate 120. Faceplate 120 includes a glass screen 122. As sated above, the screen 122 is normally coated with a transparent conducting film 124 such as ITO. Faceplate 120 also includes a layer 126 of phosphor and binder material. The binder material holds the phosphor particles together as well as to the faceplate.

We claim:

1. An improved field emission display device, comprising:

a screen phosphor material deposited on said screen; and binder material holding said phosphor material to said screen, said binder material comprising a conductive material.

2. An improved field emission display device according to claim 1 wherein said binder material is selected from the group including: tin(II) 2-ethylhexanoate, tin (IV) isopropoxide, tin (II) oxalate, titanium (IV) ethoxode, zinc 2,4-pentane dionate, zinc acetate, zinc oxalate, indium oxalate and cadmium oxalate.

3. An improved field emission display device according to claim 1 wherein said binder material is selected from the group including: poly(propylene carbonate), poly(propylene carbonate) and poly(ethylene Carbonate).

4. An improved field emission display device according to claim 1 wherein said binder material is selected from the group including: polyvinyl alcohol, potassium silicate, and ammonium silicate.

5. An improved field emission display device according to claim 1 wherein the glass screen is coated with transparent conducting film selected from the group including: indium tin oxide (ITO), zinc oxide (ZnO), tin oxide ($SnO_2$) doped with antimony (Sb), cadmium oxide (CdO), and cadmium tin oxide (cadmium stannate) $Cd_2SnO_4$.

6. An improved field emission display device according to claim 1 wherein the binder material is an organometallic compound selected from the group including: cadmium (Cd), titanium (Ti), zinc (Zn), tin (Sn), indium (In), antimony (Sb), tungsten (W), niobium (Nb), which form conductive and/or semiconductive oxides when heated.

7. An improved field emission display device according to claim 1 wherein said binder material is transparent.

8. A display including:

a faceplate comprising:

a transparent screen having at least one side;

a transparent conductor disposed on said side of said screen;

a layer of phosphor and binder material disposed on said transparent conductor, said binder material holding said phosphor to said transparent conductor, said binder material comprising a conductive material; and a baseplate disposed proximal said side of said screen and being spaced apart from said faceplate, the space between said baseplate and said faceplate being substantially evacuated to provide a vacuum gap between said faceplate and said baseplate, said baseplate comprising:

a base electrode;

a plurality of conical field emission cathodes having a base and a tip, the bases of said field emission cathodes being disposed on said base electrode; and a grid electrode disposed proximal the tips of said field emission cathodes, the tips of said field emission cathodes emitting electrons in response to voltages applied to said base and grid electrodes, said electrons traveling towards said faceplate.

9. A display according to claim 8, said faceplate comprising substantially no aluminum.

10. A display including:

a faceplate comprising:

a transparent screen having at least one side;

a transparent conductor disposed on said side of said screen;

a layer of phosphor and binder material disposed on said transparent conductor, said binder material holding said phosphor to said transparent conductor, said binder material comprising a semiconductive material; and a baseplate disposed proximal said side of said screen and being spaced apart from said faceplate, the space between said baseplate and said faceplate being substantially evacuated to provide a vacuum gap between said faceplate and said baseplate, said baseplate comprising:

a base electrode;

a plurality of conical field emission cathodes having a base and a tip, the bases of said field emission cathodes being disposed on said base electrode; and a grid electrode disposed proximal the tips of said field emission cathodes, the tips of said field emission cathodes emitting electrons in response to voltages applied to said base and grid electrodes, said electrons traveling towards said faceplate.

11. A display according to claim 10, said faceplate comprising substantially no aluminum.

\* \* \* \* \*